June 14, 1938.  E. T. BROWN  2,120,459
SAFETY BUMPER AND COLLISION INDICATOR FOR AUTOMOBILES
Filed Sept. 25, 1936   2 Sheets-Sheet 1

INVENTOR
Eugene T. Brown
BY
Smith Tuck
ATTORNEYS

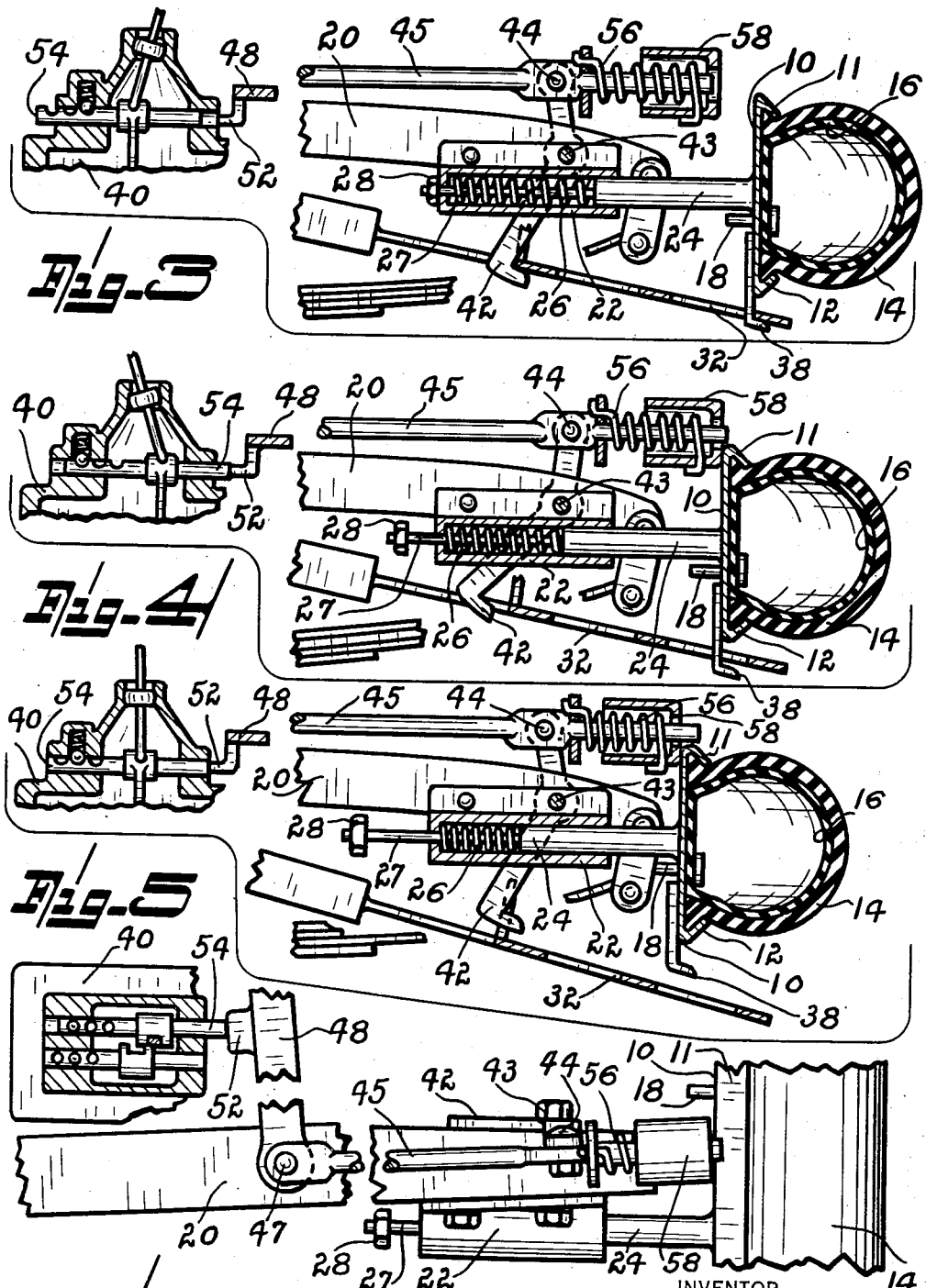

Patented June 14, 1938

2,120,459

UNITED STATES PATENT OFFICE 2,120,459

SAFETY BUMPER AND COLLISION INDICATOR FOR AUTOMOBILES

Eugene T. Brown, Seattle, Wash.

Application September 25, 1936, Serial No. 102,598

6 Claims. (Cl. 180—83)

The increasing toll by automobiles in human life and injury brings out clearly the necessity of providing means of greater safety so that in case of accident the minimum damage will result to the person, animal, or object struck. Often when accidents occur the driver being confused does not shift his transmission into neutral and, as a result, lets his clutch in after the collision with additional injury to the person hit.

There is then a real need for some indicating means that can be applied to a car which will render it inoperative after an accident has occurred. For the present such a device would be a measure of protection to an innocent, or conscientious, person and for that reason would be used by them if available. On the other hand, if legislation would require it, such an arrangement would easily stop and identify one who might otherwise be a hit and run driver.

A further requirement of such a device is that it will not be operative while the car is being maneuvered at low speeds; it should not be operative when parking the car or in driving out from a parking space where the bumper might often be severely compressed as it would be an annoyance for the safety mechanism to operate under such conditions. It is believed that these various objects are fully met and served by my present device.

Other and more specific objects will be apparent from the following description taken in connection with the accompanying drawings, wherein.

Figure 1:
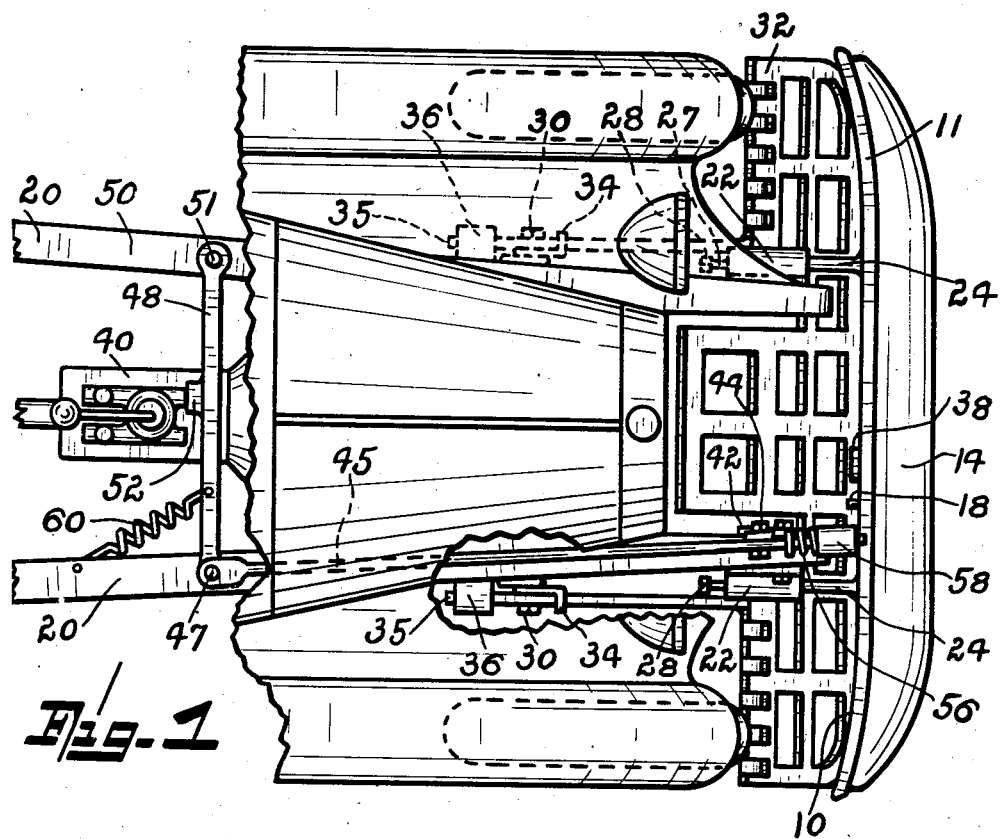
Figure 1 is a plan view showing the front portion of an automobile with my device applied to the same.

Figures 3, 4, and 5 are bracketed, fragmentary views, showing the sequence of operation of my device, each of the views being shown as a vertical section.

Figure 6 is a top plan view illustrating the mechanism shown in Figures 3, 4, and 5.

Referring to the drawings, throughout which like reference characters indicate like parts, 10 designates the bumper bar proper. This should have the same general extent as the usual bumper supplied on automobiles. Its novelty consists in that it is rimmed as at 11 and 12 with a rim entirely encircling the margins of the bumper bar proper so as to provide engaging means for a casing member 14. This general construction can follow the practices that are employed in the manufacture of detachable tires and should be supplied with an air retaining tube 16 having the usual valve fitting 18 so that air under pressure can be supplied to the tube. The pressure need not be very high; however, it should be sufficient to hold the casing in its extended, inflated position but should be low enough so that, together with a rather thin walled casing 14, a bumper unit will be produced that will be very yielding when it strikes an object or, particularly, a person, or animal.

The bumper assembly is yieldably supported from the car chassis, or frame, 20 by a plurality of guide members 22 which are adapted to slidably engage bumper support rods 24 and to house the compression springs 26. To accommodate spring 26 rod 24 should have a reduced portion as 27 which in turn is fitted with a nut or stop 28 to limit the forward movement of rod 24 under urging of the compression spring 26.

Figure 2:
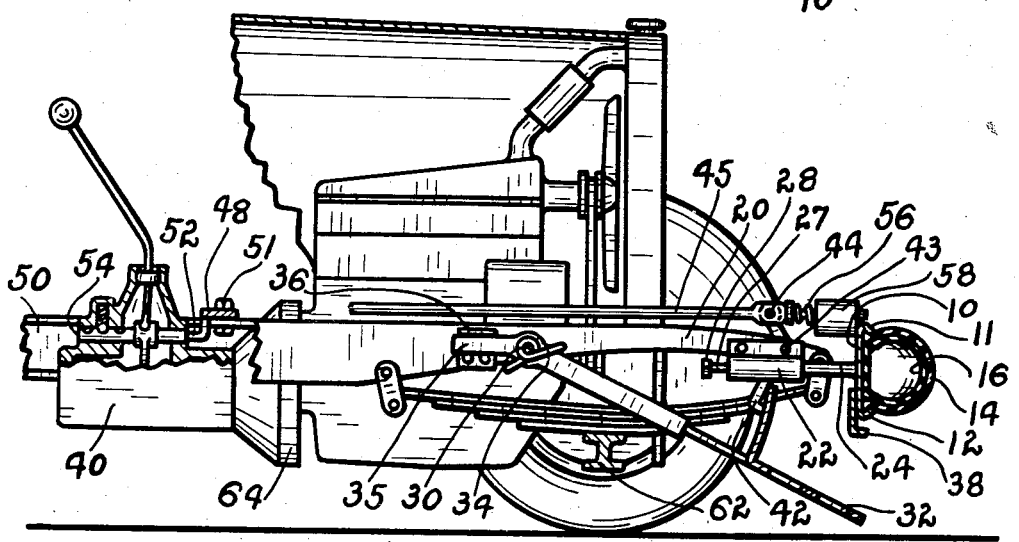
Figure 2 is an elevation of the same portion of an automobile, certain parts being shown in section to better illustrate the construction.

Pivotally secured to frame 20 as at 30 is a fender member 32. This member I preferably form of sheet metal so that it will be light in weight, yet strong and yieldable, rather than breakable in case of use during an accident. It would, of course, be possible to form the same of heavy screening which, for certain purposes, might be more desirable. A tortion spring 34 is provided to normally urge the fender to its lower position as shown in Figure 2. Downward movement is arrested by extensions of the side frames of fender 32, as 35, and a corresponding bracket stop 36 is attached to frame 30. Normally, fender 32 is held in its upper position after the showing of Figure 3 by hook member 38 attached to bumper bar 10 and so disposed as to engage a portion of the fender.

In order to prevent the untimely functioning of my device as might occur when parking the car and the like, or if the car were standing by the curb and the car next in line bumped it, I have provided means coacting with the transmission 40, of the car, so that the fender is locked in its upper position at all times except when the car is in high gear. This is accomplished by providing a pivoted hook 42 which is normally engaged with fender 32 so as to hold it up in its upper position, after the showing of Figure 3. This hook member is pivoted as at 43 and has pivotally secured to its upward extension as at 44, a control rod 45. Control rod 45 should preferably be placed as near the center of the bumper as the conformity of the car will permit. Rod 45 is pivotally secured at 47 to lever 48 which in turn is pivoted to the frame member 50 at 51. Formed as part of lever 48 is an abutment member 52; this abutment member is so positioned that the shifting fork rod 54 will engage the same, or will be engaged by it, when the transmission is in high gear position. The exact construction of this abutment member 52 will of necessity have to be modified for different types of transmissions. The showing is typical, however, of the usual transmission found in the average motor car today.

Secured to the forward end of rod 45 is a compression spring 56. This spring, in turn, engages and holds in position a cup-like sleeve 58 which is adapted for longitudinal movement upon the extension of shaft 45, and is, further, positioned so as to be engaged, under certain conditions, by the upper margin of bar 10 after the showing of Figures 4 and 5.

*Method of operation*

In using my present device the fender 32 is normally carried in its upper position as shown in Figure 3. Here it is held by hook 38 secured to bumper 10 and by hook 42, which is urged by spring 60, secured to frame 20, into its engaged position. This position maintains at all times with the car standing still or when the transmission, after the showing in the present drawings, is in reverse or second gear. In this position, even though bumper 10 collides with some object and is forced back, under which condition hook 38 might release fender 32, hook 42 will still retain the fender in its raised position.

As soon as the car is placed in high gear, or in case of cars having a fourth speed, means should be employed to have the corresponding action in both third and fourth speeds, the shifter shaft 54 will normally be moved forwardly after the showing of Figure 4 so that it engages abutment 52, thus forcing rod 45 forward against spring 60 and effecting the rearward movement of hook 42 so that it can no longer engage and support fender 32. Under these conditions the only support means for fender 32 is the forward hook 38, so if the bumper strikes an object and is driven rearwardly fender 32 will be freed and permitted to fall. This falling is accelerated by the tortion spring 34 so that it will move out of the way of hook 42 which may immediately thereafter be forced forwardly again, after the showing of Figure 5. A continued rearward movement of bumper 10 will engage sleeve 58 and through compression spring 56 move rod 45 rearwardly. When this occurs, through means of lever 48, abutment 52 will be moved back against the shifter fork shaft 54 and move the same into the neutral position, thus freeing the motor from the transmission and making it impossible for the driver of the car to proceed either through intent, or through excitement, and possibly further injure the person, animal, or object struck. In this way my device becomes a true safety fender in that a person struck is not forcibly knocked forward as occurs with the ordinary semi-rigid spring bumper. The yieldable, inflated casing 14 absorbs this initial shock which so often is the one that breaks bones and makes for very serious consequences. Then, if the person struck is knocked forward of the car or tends to partially hang on the bumper, instead of being drawn under the car as so often is the case and there being crushed by the low hanging parts such as the front axle 62, the transmission housing 64, or possibly the differential housing or rear axle, he is carried upon fender 32 which should be so arranged as to barely clear the ground, after the showing of Figure 2. It is believed that an arrangement of this kind will greatly reduce the number of serious accidents and casualties which today is the bane of the automobile industry.

After the accident it is necessary, before further use of the car can be had, to restore fender 32 to its original position. This can be done only by stopping the car and pressing back the bumper assembly against compression springs 26 until hook 38 can again be made to engage fender 32 and restore it to the position shown in Figure 3.

The foregoing description and the accompanying drawings are believed to clearly disclose a preferred embodiment of my invention but it will be understood that such changes in the invention may be made as are fairly within the scope and spirit of the following claims.

What is claimed is:

1. In a safety device for automotive vehicles having power transmission mechanism and a control element therefor, the combination with a spring-projected bumper and a spring-depressed fender pivoted beneath the bumper, of a pivoted hook retaining the fender in uplifted position, a spring-actuated lever having an abutment associated with the control element, a link connected to the lever, a spring-head on the front end of the link in the path of rearward movement of the bumper, and a pivotal connection between said hook and said link.

2. In a safety device for automotive vehicles, the combination with a yieldable spring projected bumper, an actuating-link having operative and inoperative positions and having a head in the path of the bumper, and a spring depressed fender pivoted beneath the bumper, of a retaining hook rigid with the bumper and projecting through a slot in the fender near its free end, and a second hook having a pivotal support with one end pivoted to the link and the other end of the hook engaged in a slot of the fender, and operable to engage said fender only when said link is in inoperative position.

3. In a safety device for automotive vehicles, the combination with a spring projected bumper, an actuating link having operative and inoperative positions and having a spring-head in the path of movement of the bumper, and a spring depressed fender pivoted beneath the bumper, of a retaining hook rigid (with the bumper and having a sliding engagement with the fender, a pivoted locking hook in swingable engagement with a slotted portion of the fender, and a pivotal connection between an arm of the locking hook and said link, said locking hook being operable to engage the fender only when said link is in inoperative position.

4. In a safety device for an automotive vehicle, the combination with a spring-projected bumper, an actuating link having operative and inoperative positions and having a spring-head in path of movement of the bumper, and a spring depressed fender pivoted beneath the bumper, of a retaining hook rigid with and depending from the bumper, said hook having a sliding engagement with the fender for the support thereof, a spring-actuated locking hook having a stationary pivot support and adapted to hold the fender in uplifted position when the link is in inoperative position, and a pivotal connection between an arm of the locking hook and said link.

5. In a safety device for an automotive vehicle, the combination with a spring-projected bumper, a spring actuated link having operative and inoperative positions and having a spring-head in the path of said bumper, and a spring depressed fender pivoted beneath the bumper, said fender having spaced slots, a hook rigid with the bumper and engaged in one of the slots of the fender, and means under control of the spring actuated link for holding the fender in uplifted position when the link is in inoperative position.

6. In a safety device for automotive vehicles having a transmission mechanism and control lever therefor, the combination with a yieldable spring projected bumper, an actuating link having a head in the path of the bumper, said link being connected with said control lever and having operative and inoperative positions, and a spring depressed fender pivoted beneath the bumper, of a retaining hook rigid with the bumper and projecting through a slot in the fender near its free end, and a second hook having a pivotal support with one end pivoted to the link and the other end of the hook operable to engage a slot in the fender only when said link is in inoperative position.

EUGENE T. BROWN.